United States Patent [19]

Stapler et al.

[11] 3,959,232

[45] May 25, 1976

[54] POLYAMIDE FROM HEXAHYDROBENZODIPYRROLE

[75] Inventors: John T. Stapler, Northboro; Joseph Bornstein, Needham Heights, both of Mass.

[73] Assignee: The United States of America as represented by the Secretary of the Army, Washington, D.C.

[22] Filed: Nov. 8, 1974

[21] Appl. No.: 522,163

Related U.S. Application Data

[62] Division of Ser. No. 373,828, June 26, 1973, abandoned.

[52] U.S. Cl............................ 260/78 R; 260/30.2; 260/30.6 R; 260/30.8 R; 260/32.6 NA; 260/33.4 R; 260/78 SC; 260/326.1
[51] Int. Cl.².................................. C08G 69/26
[58] Field of Search .................. 260/78 R

[56] References Cited
UNITED STATES PATENTS

| | | | |
|---|---|---|---|
| 3,197,442 | 7/1965 | Kramer et al. | 260/78 R |
| 3,503,939 | 3/1970 | Williams | 260/78 R |
| 3,565,837 | 2/1971 | Drawert et al. | 260/78 R |
| 3,819,758 | 6/1974 | Cleary | 260/78 R |

OTHER PUBLICATIONS

Helvetica Chimica acta, Vol. 30, 1947, pp. 2035–2045.
Chemical Abstracts, Vol. 42, 3755, Ruggli et al.

*Primary Examiner*—Harold D. Anderson
*Attorney, Agent, or Firm*—Nathan Edelberg; Robert P. Gibson; Lawrence E. Labadini

[57] ABSTRACT

Novel compounds having the following structural formulae:

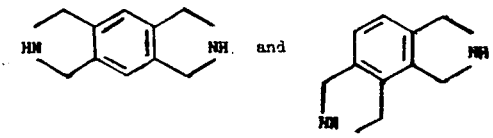

are disclosed and polymers formed by condensing the above compounds with organic diacids are prepared which polymers are useful in forming thermally stable, flame-resistant fibers and films.

6 Claims, No Drawings

3,959,232

POLYAMIDE FROM HEXAHYDROBENZODIPYRROLE

The invention described herein may be manufactured, used and licensed by or for the Government for governmental purposes without the payment to us of any royalty thereon.

This is a Division of application Ser. No. 373,828, filed June 26, 1973, now abandoned.

BACKGROUND OF THE INVENTION

This invention relates to novel hexahydrobenzodipyrrole compounds useful in preparing novel, thermally stable, flame-resistant polymers and to such polymers.

Clothing normally affords little protection to the wearer against the thermal effects of flame or radiation and, as a consequence, methods and materials are under investigation with the objective being the development of clothing systems having a higher level of thermal protection. One approach has been to synthesize new organic polymers having improved thermal stability. While a number of polymers are presently known which have good high temperature properties, only a few have been successfully converted to fibers. The novel hexahydrobenzodipyrrole compounds of this invention have been copolymerized to produce novel polymers which can be formed into fibers and films which exhibit good high temperature properties.

SUMMARY OF THE INVENTION

Synthesis of novel hexahydrobenzodipyrrole compounds, 1,2,3,5,6,7-Hexahydrobenzo[1,2-c:4,5-c']dipyrrole and 1,2,3,4,5,6- hexahydrobenzo [1,2-c:3,4-c']dipyrrole useful in forming novel copolymers with organic diacids which copolymers can be converted to fibers and films that are both thermally stable and flame-resistant.

DESCRIPTION OF THE PREFERRED EMBODIMENTS

The novel hexahydrobenzodipyrrole compounds of this invention have the following structural formulae:

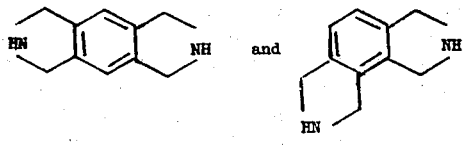

and have the chemical nomenclature 1,2,3,5,6,7-hexahydrobenzo[1,2-c:4,5-c']dipyrrole and 1,2,3,4,5,6-hexahydrobenzo[1,2-c:3,4-c']dipyrrole, respectively. The preparation of these novel compounds will be described in detail in the examples which follow, which examples are presented to illustrate the invention. The percentages are by weight unless otherwise indicated. Melting points are uncorrected and the characteristic absorption bands are reported for the infrared spectra. Nuclear magnetic resonance spectra are measured in parts per million δ downfield from tetramethylsilane as internal standard. Mass spectra are determined at 70 eV.

EXAMPLE 1

A 500-ml three-necked flask containing 275 ml of carbon tetrachloride was fitted with a large condenser, mechanical stirrer, thermometer and heating mantel. Added to the flask in the following order were these recrystallized reagents: 16.8 g (0.125 mol) durene; 89.1 g (0.50 mol) N-bromosuccinimide (NBS); and 3 g (0.0124 mol) benzoyl peroxide. While stirring vigorously to keep the insoluble NBS in suspension, the mixture was slowly heated to reflux temperature. At this point excessive foaming occurred which necessitated temporary removal of the heat source. Frothing diminished after about 2 min. and reflux action continued uninterrupted for about 30 min. Succinimide, an insoluble co-product, was removed by filtration while the solution was still hot. Cooling the filtrate over night afforded 17 g of a white, semi-waxy solid, mp 114°–140.5°C. One recrystallization from cold chloroform gave 8.55 g (14.8%) of 1,2,4,5-tetrakis (bromoethyl) benzene, hereinafter (I), as colorless granules; mp 157°–159°C. The latter product was sufficiently pure for the next synthetic step. For analytical purposes, a second recrystallization was effected from acetonitrile; recovery of the product approximated 50%.

Anal. Calcd. for $C_{10}H_{10}Br_4$: C,26.70; H, 2.24; Br, 71.06. Found: C, 26.63; H, 2.27; Br, 71.18.

A liter, three-necked flask was fitted with an efficient stirrer (preferably a mechanical type), thermometer and a pressure-equalizing dropping funnel that carried an inlet for admission of dry nitrogen. The entire assembled apparatus was dried by heating with soft flame (or electric heat gun) as a brisk stream of nitrogen was passed through the system. The flow of nitrogen was reduced to about 5 ml per minute. Into the cooled flask was placed 12.98 g (0.300 mol) of 56% sodium hydride dispersed in mineral oil and 90 ml of purified dimethylformamide (DMF). The mixture was stirred at room temperature and a solution of 25.9 g (0.150 mol) of p-toluenesulfonamide (freshly recrystallized) in 90 ml of purified DMF was added dropwise over a period of 75 min. Slow addition was necessitated by excessive foaming. The walls of the flask were then quickly washed down with 30 ml of DMF while the condenser was momentarily removed. The resulting suspension was stirred at room temperature for 1 hr and at 65°C for an additional hour (a water bath). Then a solution of 33.9 g (0.075 mol) of (I) in 300 ml of purified DMF was added dropwise with vigorous stirring at such a rate as to maintain a temperature of 65°–70°C. Subsequently, the dark brown reaction mixture was stirred at room temperature for 3 hours and poured into 600 ml of ice water. After standing overnight, the creamy brown precipitate was collected by suction filtration, washed three times with 200-ml portions of hot acetone followed by three additional washings with 100-ml portions of hot water. 20 grams (56.6%) of the crude, light-yellow precipitate (mp 150°–240°C. with slow decomposition during the entire range) was collected air-dried and dissolved in 350 ml of m-cresol at a temperature of 138°–148°C. (Decomposition occurred at temperatures above this range). After cooling to room temperature, an equal volume of methanol was added and a fine, faint-yellow crystalline 1,2,3,5,6,7-hexahydro-2,6-bis(p-tolylsulfonyl) benzo[1,2-c:4,5-c'] dipyrrole, hereinafter (II), precipitated. The solid was collected, washed with cold methanol, and dried over phosphorus pentoxide in a vacuum desiccator. The yield was 1.9 g (53%); mp 246.5°–248°C (dec); sodium fusion: positive for sulfur, nitrogen, negative for halogen; ir (KBr) 1155 and 1335 ($C—SO_2—N$); nmr

[($F_3C$)$_2$CHOH] δ 2.42 (s,6, CH$_3$), 2.96 (s.8CH$_2$), 7.00 (s,2,φ), 7.38–7.78 (m,8,φ).

Anal. Calcd. for C$_{24}$H$_{24}$N$_2$O$_4$S$_2$: C, 61.51; H, 5.16; N, 5.98; O, 13.66; S, 13.69. Found: C, 61.74; H, 5.67; N, 6.04; O, 13.31; S, 13.24.

In a 1-liter round-bottomed flask were placed 39.6 g (0.085 mol) of (II), 50.28 g (0.53 mol) phenol, 616 ml (5.45 mol) of redistilled 48% hydrobromic acid and 263.9 ml of propionic acid. The flask was fitted with a reflux condenser and connected to a source of low-pressure nitrogen, an oil bubbler, a safety trap and a magnetic stirrer. The mixture was heated to reflux, and after 5 min a brief period of foaming ensued. Reflux was continued for 52 hr. During this period, the color of the mixture changed from red to deep brown. Cooling over night at room temperature produced a cream-colored precipitate which was collected on a Buchner funnel and air dried. The solid was taken up in 250 ml of boiling water and a hot-water insoluble material was removed by filtration, which, when recrystallized from m-cresol was found to be 1.12 g (2.8%) of unreacted (II). Also separated was about 0.2 g char. The aqueous filtrate containing 1,2,3,5,6,7-hexahydrobenzo[1,2-c:4,5;-c']dipyrrole dihydrobromide, hereinafter (III) was treated with 100 ml of 48% HBr and then placed in the refrigerator for 12 hours. Long, transparent crystals were collected and recrystallized once from 38% HBr containing charcoal. A second recrystallization gave 24.43 g (90%) of the dihydrobromide (III), mp 268°–270°C (dec); Sodium fusion: positive for halogen and nitrogen, negative for sulfur; ir 2800 (NH$_2$).

Anal. Calcd. for C$_{10}$H$_{14}$Br$_2$N$_2$: C, 37.30; H, 4.38; Br, 49.63; N, 8.69. Found: C, 37.33; H, 4.50; Br, 49.40; N, 8.61.

Five grams (0.01 mol) of the dihydrobromide (III) was dissolved in a minimum amount of hot water (about 20 ml). While stirring the solution vigorously a large excess (3.2 ml) of 33% NaOH was added. A white solid separated immediately. The suspension was quickly chilled in an ice-cold bath, the solid collected by filtration and washed three times with 10-ml portions of ice-cold water. After partial drying for 10–15 min under a stream of dry nitrogen, the solid was transferred with a minimum exposure to the atmosphere to a desiccator and dried under vacuum over phosphorus pentoxide for 24 hrs. The yield of 1,2,3,5,6,7-hexahydrobenzo[1,2-c:4,5-c'] dipyrrole (IV), was 1.53 g (96.5%), mp 166°–167°C (dec). A small sample was sublimed (111°C/2 mm) for analysis; ir KBr) 3330 (NH), 408 (C—N—C); nmr (CDCl$_3$) δ 2.15 (s,2,NH), 4.18 (s,8,CH$_2$), 7.07 (s,2, φ); mass spectrum (70 ev) m/e (rel intensity) 160 (92, M$^+$), 159 (97, M-1) 142 (8), 132 (68), 131 (83), 130 (100), 117 (78), 103 (69), 102 (45), 91 (20), 78 (58), 77 (86), 63 (80), 52 (62), 50 (81), 41 (35), 39 (82), 28 (96).

Anal. Calcd. for C$_{10}$H$_{12}$N$_2$: C, 74.97; H, 7.55; N, 17.48. Found: C, 74.90; H, 7.64; N, 17-07.

EXAMPLE 2

A slurry of prehnitene (1,2,3,4-tetramethylbenzene) (67.1 g, 0.50 mol), N-bromosuccinimide (NBS) (356 g, 2.00 mol) and benzoyl peroxide (3 g) in 1-liter of carbon tetrachloride was heated under reflux for 2 hours. The resulting succinimide was filtered from the hot solution. Chilling the filtrate overnight afforded 106.5 g (47.9%) of a yellow, crude product, mp 104°–114°C. For elemental analysis a sample was recrystallized from 95% ethanol (6 g per 100 ml solvent) and dried overnight (61°C, 10 mm) to give colorless crystals, mp 120°–122°C. A small amount of a sticky, brown polymeric residue was removed from the original mother liquor and also during the recrystallization of crude 1,2,3,4-tetrakis(bromomethyl)benzene, hereinafter (V).

Anal. Calcd. for C$_{10}$H$_{10}$Br$_4$: C, 26.70; H, 2.24; Br, 71.06. Found: C, 27.13; H, 2.37; Br, 70.03.

To a stirred suspension of an excess of sodium hydride (54% dispersed in mineral oil, 5.55 g, 0.125 mol) in 30 ml dry DMF (at room temperature and under dry nitrogen) was added dropwise a solution of p-toluenesulfonamide (21.4 g, 0.125 mol) in 75 ml DMF during 1¼ hr. The resulting suspension was stirred for an additional 1 hour at room temperature and subsequently for 1 hour on a water bath at 55°–60°C. A solution of (V) (11.3 g, 0.025 mol) in 100 ml DMF was then added dropwise to the mixture over a 1-hour period while vigorous stirring and heating at 55°–60°C were maintained. Near the end of the addition, all particles had dissolved. The bath was removed and stirring continued until the reaction mixture was at room temperature. The solution was then filtered and the filtrate poured onto 750 ml of ice water. The resulting precipitate was filtered and washed five times with cold water. The crude product, was recrystallized from a 75:25 mixture of n-butanol-95% ethanol and dried overnight (120°C, 10 mm) to afford a fine, white crystalline material 1,2,3,4,5,6-hexahydro-2,5-bis(p-tolysulfonyl)-benzo(−) [1,2-c:3,4-c']dipyrrole, herein (VI), (8.89 g, 76.5%), mp 228°–240°C dec; ir (KBr) 1160 and 1345 (C—SO$_2$—N); nmr (deuterated DMSO) δ 2.35 (s,6,CH$_3$), 4.59 (s,8,CH$_2$), 7.09 (s,2,φ-H), 7.78–7.34 (m,8,φ-H).

Anal.Calcd. for C$_{24}$H$_{24}$N$_2$O$_4$: C, 61.51; H, 5.16; N, 5.98; O, 13.66; S, 13.69. Found: C, 61.40; H, 5.27; N, 5.93; O, 13.80 (by difference); S, 13.66.

A stirred mixture of (VI) (4.68 g, 0.01 mol), phenol (6.4 g), 48% hydrobromic acid (77 ml) and propionic acid (33 ml) was heated under reflux for 55 hours. After evaporation of the solvents, the dry residue was dissolved in a minimum of water, the solution remaining orange-red in spite of attempts to decclorize it with carbon. Five washings with ether to remove phenol also removed the color. Following concentration of the solution to about ⅓ its original volume and refrigeration overnight, a brown precipitate was obtained. It was taken up in hot absolute methanol. Decolorizing followed by acidification with 10 ml hydrobromic acid and chilling overnight afforded, after drying (61°C, 10 mm), 1,2,3,4,5,6-hexahydrobenzo[1,2-c:3,4-c'](−) dipyrrole dihydrobromide, hereinafter (VII), (1.23 g, 33%) as a fine white powder, mp 268°–274°C dec.

Anal. Calcd. for C$_{10}$H$_{14}$Br$_2$N$_2$: C, 37.30; H, 4.38; Br, 49.63; N, 8.69. Found: C, 36.99; H, 4.28; Br, 49.62; N, 8.74.

An excess of sodium hydroxide (12 drops of a 33% solution) was added quickly to a solution of (VII) (0.717 g, 0.002 mol in 1 ml of carbon dioxide-free water) and a small amount of precipitate formed. Filtering the precipitate proved difficult since the material tended to liquefy on the funnel during suction, passing through the filter paper and reprecipitating in the filtrate. Instead, 1,2,3,4,5,6-hexahydrobenzo[1,2-c:3,4-c']dipyrrole, hereinafter (VIII), was extracted with 10 100-ml portions of ethyl ether and dried overnight over anhydrous potassium carbonate. The slightly yellow solid obtained after evaporation of the ether was sublimed (98°C, 0.8 mm) to afford (VIII) (0.204 g, 57%) as a white crystalline product, mp 102°–103°C dec; a small amount of polymer was obtained as residue in the sublimation apparatus. Infrared spectrum (KBr) 3155 (NH); nmr (DCCl$_3$) δ 2.20 (s,2,NH), 4.22–4.15 (d,8,CH$_2$), 7.10 (s,2,φ-H); mass spectrum (70 eV) m/e (rel intensity) 161 (M + 1, 86.6), 160 (M, 100), 133 (50), 131 (79).

Anal. Calcd. for C$_{10}$H$_{12}$N$_2$: C, 74.97; H, 7.55; N, 17.48. Found: C, 75.24; H, 7.71; N, 16.67.

Polymers were prepared by copolymerizing the novel compounds (IV) and (VIII) of this invention with selected organic diacids. The novel polymers have the structural formula

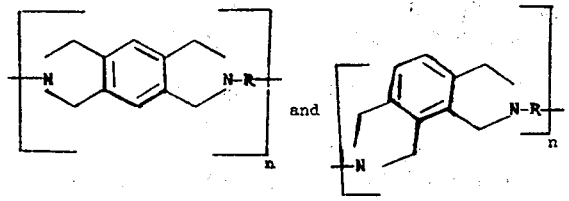

wherein R is

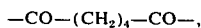

—CO—(CH$_2$)$_4$—CO—,

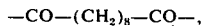

—CO—(CH$_2$)$_8$—CO—,

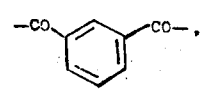

and

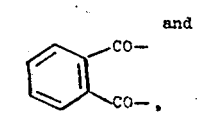

and n is 25 to 5000. All of the polymers of this invention are soluble in strong solvents such as 95% sulfuric acid, hexafluoroisopropanol and m-cresol and viscous spinning dopes are obtained with hot dimethyl formamide, dimethyl acetamide, N-methyl pyrrolidone and hexamethylphosphoramide. Gel formations are created with solvents such as ethylene diamine and ethylene triamine. The following Examples illustrate in detail the synthesis of each of the novel copolymers.

EXAMPLE 3

Poly(N,N'-di-1,2,3,5,6,7-hexahydrobenzo[1,2-c:4,5-c']dipyrrole adipamide)

in a reaction vessel fitted with jacketed high-speed stirrer and a "T" tube for maintaining a nitrogen atmosphere, a solution of purified (IV) (5 g, 0.031 mol) in 100 ml dry methylene chloride and triethylamine (6.3 g, 0.062 mol) was added. After stirring for 2 minutes, water and dry-ice chunks were placed in the jacket. Stirring continued for 10 minutes or until the solution temperature ranged from 0°–3°C. Adipyl chloride (5.6 g, 0.031 mol) in 100 ml methylene chloride was added all at once. After stirring for an additional 5 minutes, the polymer was precipitated by pouring the mixture into 500 ml n-hexane followed by washing successively four times with 200 ml portions of cold water, hot water, acetone and methanol and dried to give the polyamide (6.4 g, 76%); solvents: DMF, hexafluoroacetone, hexafluoroisopropanol, N-methyl-2-pyrrolidone, 95% sulfuric acid nd m-cresol; inherent viscosity: 0.34; TGA 0°–760°C. 76% weight loss.

EXAMPLE 4

Poly(N,N'-di-1,2,3,5,6,7-hexahydrobenzo[1,2-c:4,5-c']dipyrrole sebacamide).

Following the procedure for Example 3 above, (IV) (3.87 g, 0.024 mol) and triethylamine (6.3 g, 0.048 mol) in 80 ml methylene chloride were reacted with sebacoyl chloride (5.7 g, 0.02 mol) in 80 ml methylene chloride to give the polyamide (6.4 g 82%); solvents: same as in Example 3; TCA 0°–760°C, 65% weight loss; inherent viscosity: 0.29.

EXAMPLE 5

Poly(N,N'-di-1,2,3,5,6,7-hexahydrobenzo[1,2-c:4,5-c']dipyrrole terephthalamide).

The dihydrobromide salt (III) (2.17 g, 0.006 mol) was placed in a moisture-free apparatus similar to that described in Example 3 above. By a dropper funnel triethylamine (2.68 g, 0.027 mol) in 50 ml methylene chloride was added and the mixture stirred at least 5 minutes to insure complete solution of the free base (IV) formed by the reaction. After adding water and carbon dioxide pellets to the jacket, the procedure for Example 3 was followed. Terephthaloyl chloride (1.37 g, 0.006 mol) in 50 ml methylene chloride was added all at once. After washing, the polyamide was obtained (1.06 g, 36.6%); solvents: 95% sulfuric acid, hexafluoroisopropanol and m-cresol; TGA 0°–760°C, 62% weight loss; inherent viscosity: 0.08.

EXAMPLE 6

Poly(N,N'-di-1,2,3,5,6,7-hexahydrobenzo[1,2-c:4,5-c']dipyrrole isophthalamide).

Following the procedure of Example 5, hydrobromide salt (III) (0.9 g, 0.0028 mol) was reacted with triethylamine (1.13 g, 0.0111 mol) in 22.5 ml methylene chloride and isophthaloyl chloride (0.566 g, 0.0028 g) in 22.5 ml methylene chloride to give the polyamide (0.82 g, 100%); mp 306°–310°C; solvents: same as in Example 3; TGA 0°–760°C, 63% weight loss; PMT 300°–310°C; inherent viscosity: 0.40.

EXAMPLE 7

Poly(N,N'-di-1,2,3,5,6,7-hexahydrobenzo[1,2-c:4,5-c']dipyrrole phthalamide).

Following the procedure of Example 5, the dihydrobromide salt (III) (0.9 g, 0.0028 mol) was reacted with triethylamine (1.13 g, 0.011 mol) in 22.5 ml methylene chloride and phthaloyl chloride (0.566 g, 0.0028 mol) in 22.5 ml methylene chloride to obtain the polyamide (0.275 g, 33.9%); solvents: same as in Example 3; TGA 0°–760°C, 57% weight loss; inherent viscosity: 0.24.

EXAMPLE 8

Poly(N,N'-di-1,2,3,4,5,6-hexahydrobenzo[1,2-c:4,5-c']dipyrrole adipamide).

Following procedure of Example 5, the dihydrobromide salt (III) (0.7 g, 0.022 mol) was reacted with triethylamine (0.88 g, 0.0087 mol) in 17.5 ml methylene chloride (0.39 g, 0.0022 mol) in 17.5 ml methylene chloride to give the polyamide (0.49 g, 83%); solvents: same as in Example 3, TGA 0°–760°C, 76% weight loss; inherent viscosity: 0.21

EXAMPLE 9

Poly(N,N'-di-1,2,3,4,5,6-hexahydrobenzo[1,2-c:3,4-c']dipyrrole sebacamide).

Following the procedure of Example 5, the dry dihydrobromide salt (III) (0.50 g, 0.0016 mol) was reacted with triethylamine (0.65 g, 0.0048 mol) in 17.5 ml methylene chloride and sebacoyl chloride (0.38 g, 0.0016 mol) in 17.5 ml methylene chloride to give the polyamide (0.23 g, 43%); solvents: same as in Example 3; TGA 0°–760°C, 75% weight loss; inherent viscosity: 0.42.

EXAMPLE 10

Poly(N,N'-di-1,2,3,4,5,6-hexahydrobenzo[1,2-c:3,4-c']dipyrrole terephthalamide).

Following the procedure of Example 5, the dry dihydrobromide salt (III) (1.94 g, 0.006 mol) was reacted with triethylamine (2.49 g, 0.024 mol) in 45 ml methylene chloride and terephthaloyl chloride (1.25 g, 0.006 mol) in 45 ml methylene chloride to obtain the polyamide (1.79 g, 97.3%); solvents: same as in Example 3, TGA 0°–760°C, 49% weight loss; inherent viscosity: 0.06.

EXAMPLE 11

Poly(N,N'-di-1,2,3,4,5,6-hexahydrobenzo[1,2-c:3,4-c']dipyrrole isophthalamide).

Following the procedure of Example 5, the dry dihydrobromide salt (III) (2.99 g, 0.124 mol) was reacted with triethylamine (4.04 g, 0.049 mol) in 100 ml methylene chloride and isophthaloyl chloride (2.03 g, 0.0124 mol) in 100 ml methylene chloride to obtain the polyamide (3.53 g, 98%); solvents: same as in Example 3; TGA 0°–760°C, 49% weight loss; inherent viscosity: 0.32.

EXAMPLE 12

Poly(N,N'-di-1,2,3,4,5,6-hexahydrobenzo[1,2-c:3,4-c']dipyrrole phthalamide).

Following the procedure of Example 5, the dry dihydrobromide salt (III) was reacted with triethylamine (0.99 g, 0.0087 mol) in 17.5 ml methylene chloride and phthaloyl chloride (0.426 g, 0.0022 mol) in 17.5 ml methylene chloride to obtain the polyamide (0.4 g, 66.4%); solvents: same as in Example 3; TGA 0°–760°C, 60% weight loss; inherent viscosity: 0.31

All of the polymers of this invention show good thermal stability as indicated by thermogravimetric analysis (TGA). TGA was carried out on all polymers in the temperature range of 0°–760°C under nitrogen and at atmospheric pressure. Featureless curves were obtained on untreated polymers from −50°C to the onset of decomposition points determined by Differential Scanning Calorimetry. None of the polymers have melting points as determined in the usual manner but undergo decomposition at temperatures above 360°C and swell or intumesce without any display of fluidity. As a result, melting points were not obtainable.

We claim:

1. A film and fiber formed polymer selected from the class of polyamides consisting essentially of repeating units having the following structural formulae:

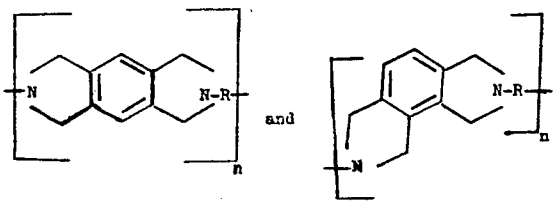

wherein R is selected from the group consisting of:

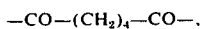

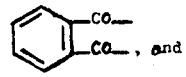

$n$ is 25 to 5000.

2. The polymer according to claim 1 wherein R is —CO—(CH$_2$)$_4$—CO—.

3. The polymer according to claim 1 wherein R is —CO—(CH$_2$)$_8$—CO—.

4. The polymer according to claim 1 wherein R is

5. The polymer according to claim 1 wherein R is

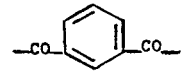

6. The polymer according to claim 1 wherein R is

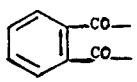

* * * * *